(12) United States Patent  (10) Patent No.: US 8,078,942 B2
Jordan et al.  (45) Date of Patent: Dec. 13, 2011

(54) REGISTER ERROR CORRECTION OF SPECULATIVE DATA IN AN OUT-OF-ORDER PROCESSOR

(75) Inventors: Paul J. Jordan, Austin, TX (US);
Christopher H. Olson, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1134 days.

(21) Appl. No.: 11/849,749

(22) Filed: Sep. 4, 2007

(65) Prior Publication Data

US 2009/0063899 A1    Mar. 5, 2009

(51) Int. Cl.
*G11C 29/00* (2006.01)
*H03M 13/00* (2006.01)

(52) U.S. Cl. ........................ 714/773; 714/764
(58) Field of Classification Search ................. 714/773, 714/764
See application file for complete search history.

(56) References Cited

U.S. PATENT DOCUMENTS

| | | | |
|---|---|---|---|
| 4,995,041 A * | 2/1991 | Hetherington et al. | 714/763 |
| 5,233,616 A * | 8/1993 | Callander | 714/758 |
| 6,363,471 B1 * | 3/2002 | Meier et al. | 711/220 |
| 6,453,427 B2 * | 9/2002 | Quach et al. | 714/6.24 |
| 6,584,595 B2 | 6/2003 | Cypher | |
| 6,615,366 B1 * | 9/2003 | Grochowski et al. | 714/10 |
| 6,625,749 B1 * | 9/2003 | Quach | 714/10 |
| 6,625,756 B1 * | 9/2003 | Grochowski et al. | 714/17 |
| 6,996,766 B2 | 2/2006 | Cypher | |
| 7,058,877 B2 | 6/2006 | Tremblay et al. | |
| 7,188,296 B1 | 3/2007 | Cypher | |
| 7,543,007 B2 * | 6/2009 | Iacobovici | 708/209 |
| 7,555,692 B1 * | 6/2009 | Iacobovici | 714/746 |
| 7,769,795 B1 * | 8/2010 | Iacobovici | 708/233 |
| 2006/0156177 A1 * | 7/2006 | Kottapalli et al. | 714/758 |
| 2008/0229145 A1 * | 9/2008 | Bose et al. | 714/10 |

\* cited by examiner

*Primary Examiner* — Joseph D Torres
(74) *Attorney, Agent, or Firm* — Lawrence J. Merkel; Meyertons, Hood, Kivlin, Kowert & Goetzel, P.C.

(57) ABSTRACT

In one embodiment, a processor comprises a first register file configured to store speculative register state, a second register file configured to store committed register state, a check circuit and a control unit. The first register file is protected by a first error protection scheme and the second register file is protected by a second error protection scheme. A check circuit is coupled to receive a value and corresponding one or more check bits read from the first register file to be committed to the second register file in response to the processor selecting a first instruction to be committed. The check circuit is configured to detect an error in the value responsive to the value and the check bits. Coupled to the check circuit, the control unit is configured to cause reexecution of the first instruction responsive to the error detected by the check circuit.

19 Claims, 4 Drawing Sheets

US 8,078,942 B2

REGISTER ERROR CORRECTION OF SPECULATIVE DATA IN AN OUT-OF-ORDER PROCESSOR

BACKGROUND

1. Field of the Invention

This invention is related to processors and, more particularly, to error detection and correction in processors.

2. Description of the Related Art

Error codes are commonly used in electronic systems to detect and correct data errors, such as transmission errors or storage errors. For example, error codes are used to detect and correct errors in data transmitted via any transmission medium (e.g. conductors and/or transmitting devices between chips in an electronic system, a network connect, a telephone line, a radio transmitter, etc.). Error codes are also used to detect and correct errors associated with data stored in the dynamic random access memory (DRAM) of computer systems. One common use of error codes is to detect and correct errors of data transmitted on a data bus of a computer system. In such systems, error detection/correction bits, or check bits, are generated for the data prior to its transfer or storage. When the data is received or retrieved, the check bits are used to detect errors within the data (and possibly correct the errors, if the scheme supports correction).

Component failures are a common source of error in electrical systems. Faulty components include faulty memory chips or faulty data paths provided between devices of a system. Faulty data paths can result from, for example, faulty pins, faulty data traces, or faulty wires. Additionally, memory modules, which contain multiple memory chips, may fail. Circuitry which drives the data paths may also fail.

Another source of error in electrical systems are so-called "soft" or "transient errors". Transient memory errors are caused by the occurrence of an event, rather than a defect in the memory circuitry itself. Transient memory errors occur due to, for example, random alpha particles striking the memory circuit. Transient communication errors occur due to noise on the data paths, inaccurate sampling of the data due to clock drift, etc. On the other hand, "hard" or "persistent" errors occur due to component failure.

Generally, various error detection code (EDC) and error correction code (ECC) schemes are used to detect and correct memory and/or communication errors. EDC and ECC schemes are generally referred to herein as error protection schemes, where a given scheme can be capable of only error detection, or both detection and correction. For example, parity can be used. With parity, a single parity bit is stored/transmitted for a given set of data bits, representing whether the number of binary ones in the data bits is even or odd. The parity is generated when the set of data bits is stored/transmitted and is checked when the set of data bits is accessed/received. If the parity doesn't match the accessed set of data bits, then an error is detected.

Other error protection schemes assign several check bits per set of data bits. The check bits are encoded from various overlapping combinations of the corresponding data bits. The encodings are selected such that a bit error or errors are detected, and in some cases the encodings are selected such that the bit or bits in error are identifiable so that the error can be corrected (depending on the number of bits in error and the error protection scheme being used). Typically, as the number of bit errors that can be detected and/or corrected increases, the number of check bits used in the scheme increases as well.

SUMMARY

In one embodiment, a processor comprises a first register file configured to store speculative register state, a second register file configured to store committed register state, a check circuit and a control unit. The first register file is protected by a first error protection scheme and the second register file is protected by a second error protection scheme. A check circuit is coupled to receive a value and corresponding one or more check bits read from the first register file to be committed to the second register file in response to the processor selecting a first instruction to be committed. The check circuit is configured to detect an error in the value responsive to the value and the check bits. Coupled to the check circuit, the control unit is configured to cause reexecution of the first instruction responsive to the error detected by the check circuit.

In an embodiment, a method comprises executing a first instruction to generate a result; generating one or more check bits according to a first error protection scheme responsive to the result; writing the result and the one or more check bits to a first register file that stores speculative register state; selecting the first instruction to be committed to a second register file that stores committed register state, the second register file protected by a second error protection scheme that is more robust than the first error protection scheme; reading the result and the one or more check bits from the first register file responsive to the selecting; detecting an error in the result; and reexecuting first instruction responsive to the error.

BRIEF DESCRIPTION OF THE DRAWINGS

The following detailed description makes reference to the accompanying drawings, which are now briefly described.

Figure 1:
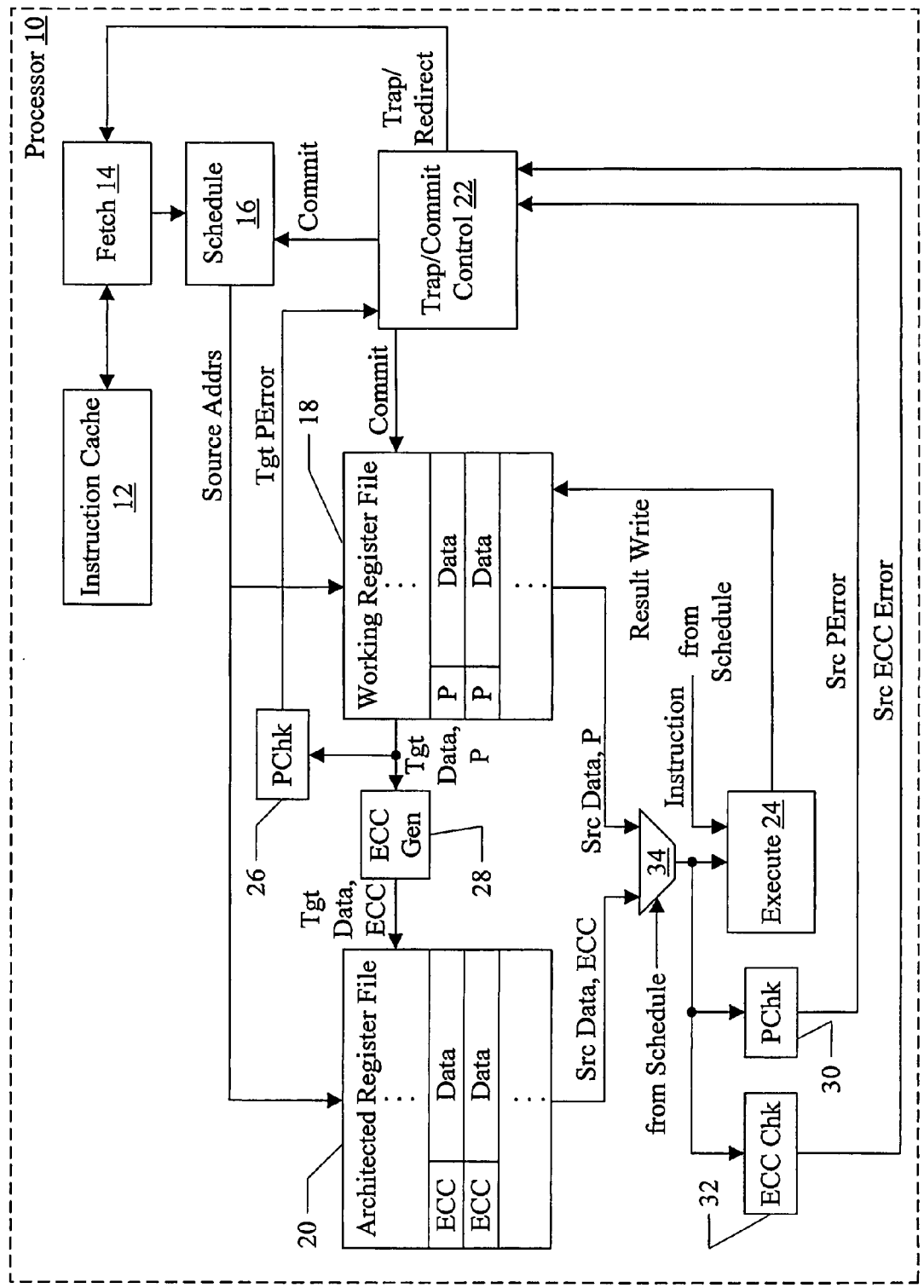
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes an instruction cache 12, a fetch unit 14, a schedule unit 16, a working register file 18, an architected register file 20, a trap/commit control unit 22, an execute unit 24, a target parity check circuit 26, an ECC generation circuit 28, a source parity check circuit 30, a source ECC check circuit 32, and a mux 34. The fetch unit 14 is coupled to the instruction cache 12, the schedule unit 16, and the trap/commit control unit 22. The schedule unit 16 is coupled to provide source register addresses to the working register file 18 and architected register file 20. The working register file 18 is configured to read the addressed location and provide the stored data and parity as an input to the mux 34. Similarly, the architected register file 20 is configured to read the addressed location and provide the stored data and ECC check bits to the mux 34. The schedule unit 16 is configured to control the mux 34 to select one of the inputs to provide a source operand to the execute unit 24 (which is also coupled to receive the instruction from the schedule unit 16). The execute unit 24 is coupled to provide an execution result to the working register file 18. The source operand is also received by the source parity check circuit 30, which is coupled to provide a source parity error (Src PError) signal to the trap/commit control unit 22. Similarly, the source operand is received by the source ECC check circuit 32, which is coupled to provide a source ECC error (Src ECC Error) to the trap/commit control unit 22. The trap/commit control unit 22 is configured to indicate, to the working register file 18 and to the schedule unit 16, that an instruction has been selected for commit. The working register file 18 is configured to provide the result data from the target location (Tgt Data) and the corresponding parity to the ECC generation circuit 28, which provides the result data and ECC to the architected register file 20 for storage. The result data and parity are also provided to the target parity check circuit 26, which is configured to detect a parity error in the result data and signal the trap/commit control unit 22.

The processor 10 may implement speculative, out-of-order execution. The working register file 18 may store speculative register state (e.g. speculatively-generated instruction execution results), and the architected register file 20 may store committed register state (the register state corresponding to instructions that have been successfully completed after becoming non-speculative, also referred to as non-speculative register state or architected state). Each of the register files 18 and 20 may implement error protection schemes to protect the stored data. However, since the working register file 18 stores speculative results that can be recreated by reexecuting the corresponding instructions, the error protection scheme may be less robust than the error protection scheme implemented for the architected register file 20. A first error protection scheme may be less robust than a second scheme if the errors that are identifiable and/or correctable by the first scheme are fewer than the second scheme. For example, in one implementation, parity may be implemented in the working register file 18 and a single error correct/double error detect (SECDED) code may be implemented in the architected register file 20. The parity scheme can detect a single bit error but cannot identify the specific bit in error (and thus the error is not correctable). The SECDED code can locate any single bit error (and thus the error is correctable) and detect any double bit error. Accordingly, the SECDED scheme is more robust than the parity scheme. Other embodiments may implement any two error protection schemes in which the working register file 18 scheme is less robust than the architected register file 20 scheme.

By implementing a less robust scheme, e.g. parity, in the working register file 18, simpler check bit generation circuitry may be included in the execution path. In one embodiment, the parity generation circuitry may be incorporated into the working register file 18. The generation circuitry for more robust schemes may be physically larger, and may have higher latency than the simpler circuitry. Additionally, since the speculative results in the working register file 18 may be regenerated by reexecuting the instruction (effectively correcting the detected error), the same correctable failure in time (FIT) rate of implementing the more robust scheme on the working register file 18 may be achieved with the less robust scheme. In a parity embodiment on the working register file 18, for example, single bit errors may be corrected in the working register file 18 (e.g. similar to the SECDED scheme on the architected register file 20). On the other hand, since the architected state is not readily regenerable, having more robust error detection/correction in the architected register file 20 may help ensure that errors are correctable more frequently.

More specifically, as instructions are selected to be committed, the results of those instructions that update an architected register may be moved from the working register file 18 to the architected register file 20. In the illustrated embodiment, the trap/commit control unit 22 may select instructions for commit as they become non-speculative. The trap/commit unit 22 may indicate the commit to the working register file 18, which may read the result data and parity from the register assigned to the committing instruction. For example, the commit indication may include the working register file address of the register assigned to the committing instruction, as well as the architected register file address of the architected register that is the target of the instruction. The working register file 18 may provide the target data and parity to the target parity check circuit 26, which may check the data for a parity error. If a parity error is detected, the target parity check circuit 26 may signal the trap/commit control unit 22. The trap/commit control unit 22 may cause the committing instruction to instead be reexecuted. The reexecution may be signaled, e.g., by signaling a redirect, to the fetch address of the committing instruction, to the fetch unit 14 using the trap/redirect interface. The redirect may be similar to a redirect from a mispredicted branch: speculative instructions subsequent to the committing instruction may be discarded, and fetching may be restarted at the redirect address. The reexecution does not include a trap. Additionally, if a parity error is detected in the target data, the write to the architected register file 20 may be aborted. Accordingly, the correction of the error in the working register file 18 may be transparent to software executed by the processor 10. It is noted that errors detected in the working register file 18 may be recorded by the processor 10 (e.g. in registers accessible to software or in memory) so that software may monitor the error rate or other statistics related to the detected errors. Similarly, errors detected (and corrected, if applicable) in the architected register file 20 may be recorded for software monitoring purposes.

On the other hand, if no parity error is detected by the target parity check circuit 26, the ECC generation circuit 28 may generate the check bits according to the error protection scheme implemented by the architected register file 20, and the data and check bits (along with the architected register address) may be provided to the architected register file 20. The architected register file 20 may write the data and check bits to the identified register in the architected register file 20.

The architected register file 20 may include one storage location per architected register, which stores the non-speculative state of that register. Two exemplary entries in the architected register file 20 are illustrated in FIG. 1. Each entry includes a data field ("Data" in FIG. 1) and an ECC field ("ECC" in FIG. 1). The data is the non-speculative register state for the corresponding register, and the ECC comprises check bits generated from the data according to an error protection scheme implemented for the architected register file 20. For example, a Hamming code may be implemented using multiple check bits per data value. Each check bit may be generated from multiple data bits, and the subsets of data bits used to generate each check bit may be overlapped such that a unique pattern occurs in the check bits for each possible data bit error that is correctable with the code. Additionally, patterns of detectable but not correctable bit errors may be defined using the code. For example, a SECDED Hamming code may be implemented that may correct any single bit error in a register's state and may detect any double bit error. Other implementations may implement other codes that correct more bit errors and/or detect more bit errors.

The number of entries in the working register file 18, and the allocation of those entries to registers, is implementation dependent based on the register renaming scheme implemented in the processor 10. For example, the working register file 18 may serve as a pool of rename registers, and the schedule unit 16 may map rename registers to architected register addresses specified as a source or target operands of instructions. Alternatively, the working register file 18 may be implemented as part of a reorder buffer and the entries may be assigned to instructions in a first-in, first-out fashion. Each entry may include a data field ("Data") storing the speculative register state and a parity bit ("P"). In one embodiment, a single parity bit may be calculated over the corresponding data field. In another embodiment, two or more parity bits may be calculated over non-overlapping subsets of bits in the data field.

Additional details of one embodiment of the processor 10 are next described. Instructions to be executed may be fetched by the fetch unit 14 (from the instruction cache 12 and/or lower levels of cache and main memory, not shown in FIG. 1), and the fetch unit 14 and may provide the instructions to the schedule unit 16. The schedule unit 16 may handle rename register assignment, and may schedule instructions for which source operands are available for execution. Instructions may be speculatively scheduled for out-of-order execution.

The schedule unit 16 may transmit the source register addresses to the architected register file 20 and the working register file 18. The architected register address may be transmitted to the architected register file 20, and the rename register address may be transmitted to the working register file 18. Alternatively, e.g. in a reorder buffer implementation, the architected register address may be transmitted to both register files 18 and 20, and the working register file 18 may select the correct entry to read based on, e.g., comparison of the architected register address to state stored in the working register file 18. Each of the register files 20 and 18 may provide data for the source operand to the mux 34, along with the check bit or bits for the data (e.g. the ECC bits from the architected register file 20, and the parity bit from the working register file 18). The mux 34 may select the data from one of the register files 18 and 20 under control of the schedule unit 16. The data from the working register file 18 may be selected if the source operand is still speculative, and the data from the architected register file 20 may be selected if the source operand is non-speculative. The selected operand is provided to the execute unit 24, along with the instruction. The execute unit 24 may execute the instruction, and write the result to the working register file 18 (that is, to the entry in the working register file 18 assigned to the speculative result of the instruction).

In parallel with execution, the source parity check circuit 30 may check the parity of the source operand (if the operand is from the working register file 18), and may signal a source parity error (Src PError) to the trap/commit control unit 22 if a parity error is detected. The source ECC check circuit 32 may check the ECC of the source operand (if the operand is from the architected register file 20) and may signal a source ECC error (Src ECC Error) if an ECC error is detected. The trap/commit control unit 22 may record the detection of the source error for subsequent processing. In other embodiments, the source ECC check circuit 32 may be coupled to the output of the architected register file 20 and the source parity check circuit 30 may be coupled to the output of the working register file 18, rather than having both coupled to the output of the mux 34. In such an embodiment, the trap/commit control unit 22 may receive the mux select controls from the schedule unit 16 to determine which error signal to record for each operand.

If an instruction is selected to be committed and a source parity error was detected for one of its source operands, the instruction may be reexecuted (similar to the case if the result of the instruction has a parity error detected by the target parity check circuit 26). The trap/commit control unit 22 may signal a redirect for the instruction. In cases in which the data in the working register file 18 is in error (e.g. due to a soft error changing a stored bit), the commit of the previous instruction that generated the source data will cause reexecution of that instruction, overwriting the error and preventing a commit of instructions that received the erroneous source data. However, it is possible that a soft error causes an erroneous read of the data from the working register file 18 without changing the data itself. Causing reexecution for a parity error on source data may account for this error case. If a source ECC error is detected, the trap/commit control unit 22 may trap the committing instruction. The trap may cause instruction execution to vector to a trap routine, which may include instructions that investigate the trap source and take corrective action. In the case of an ECC error trap, the trap routine may correct the error in the architected register file 20 and return to the instruction. In other embodiments, ECC error correction hardware may be included to correct the error and a trap may not be needed. Instead, the source ECC check circuit 32 may cause a write to the architected register file 20 to correct the erroneous data.

In some embodiments, the trap/commit control unit 22 may signal the schedule unit 16 as instructions are committed. Such signaling may permit the schedule unit 16 to free rename registers associated with the committing instructions. It is noted that, in other embodiments, reexecution of an instruction may be implemented in different fashions. For example, in a centralized scheduler implementation that retains instructions until commit, the schedule unit 16 may reschedule an instruction that the trap/commit control unit 22 detects as requiring reexecution. In such an embodiment, the redirect interface would be provided to the schedule unit 16 instead of the fetch unit 14.

Various implementations of the schedule unit 16 are possible. For example, the schedule unit 16 may comprise a centralized scheduler that stores instructions, monitors for operand readiness, and schedules ready instructions. Alternatively, the schedule unit 16 may be decentralized (e.g. reservation stations). In such an embodiment, the source operands may be read from the working register file 18/architected register file 20 before being written to the reservation stations, and forwarding of results to the reservation stations may be used to supply operands generated by subsequently executed instructions.

The architected register file 20 and the working register file 18 may have any implementation. For example, the register files may comprise static random access memory (SRAM) arrays. Alternatively, discrete registers may be used to implement the register file. A combination of registers and SRAM arrays may be used. Content addressable memory (CAM) may be used (e.g. for a reorder buffer implementation of the working register file 18).

It is noted that, while the reading of a source operand from the register files 20 and 18 is described above, generally an instruction may have multiple source operands. Each source operand may be handled in parallel, in a manner similar to the above description. Similarly, multiple instructions may be scheduled in parallel, and each source operand of each instruction may be handled in parallel. Multiple instructions may be selected for commit and may be processed in the commit path in parallel. Superscalar implementations (in which the execute unit 24 includes multiple independent execution circuits) may execute multiple instructions and generate multiple results in parallel.

Instructions may generally be speculative if the instruction is not known to be executed according to the in-order execution of instructions. Previous instructions may cause traps, or may be mispredicted (e.g. branch misprediction), which may cause the speculative instruction to be cancelled. An instruction may be committed when it is non-speculative, by ensuring that its result is made part of the architected state (e.g. by writing the result to the architected register file 20).

Figure 2:
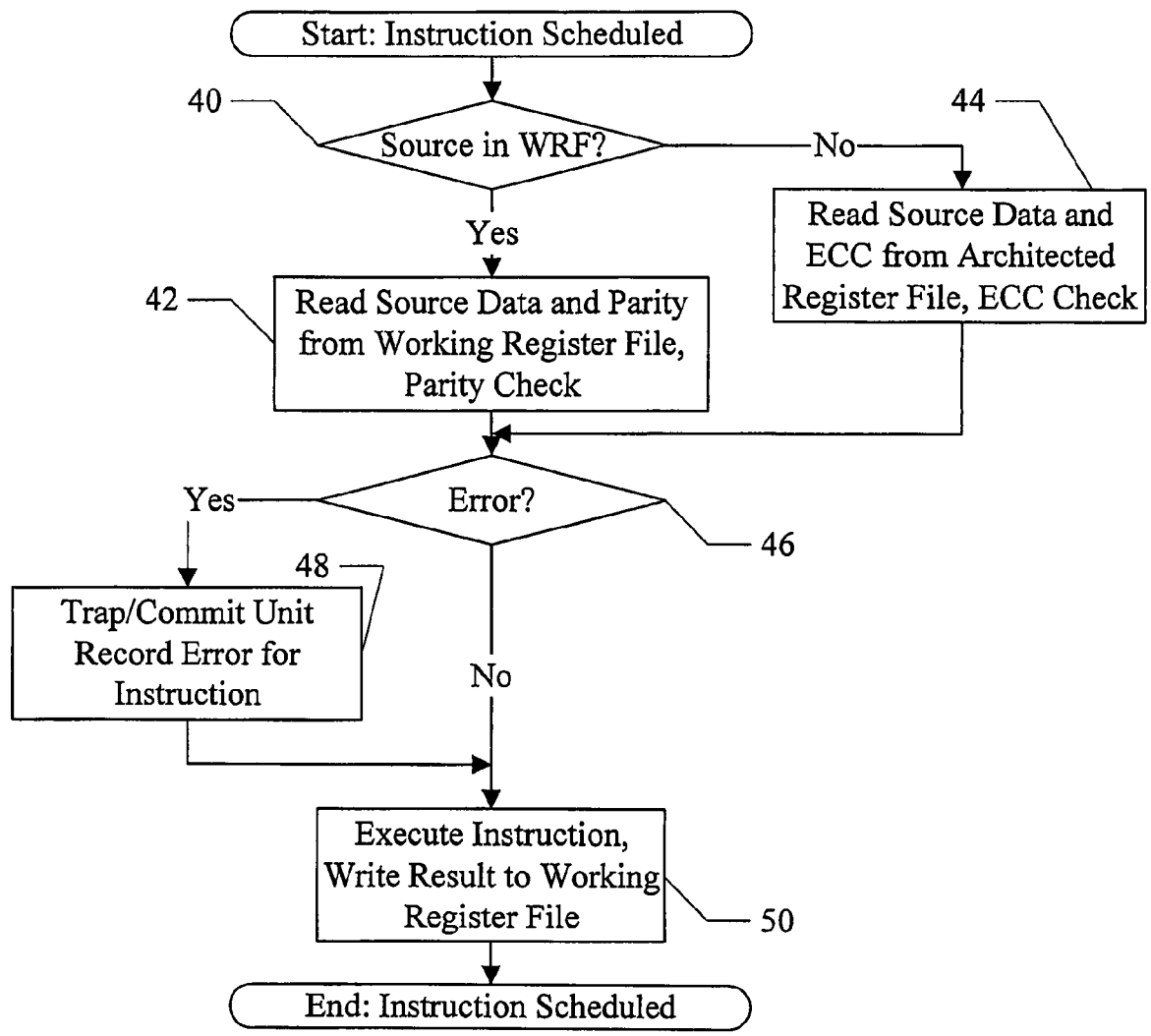
FIG. 2 is a flowchart illustrating operation of one embodiment of the processor in response to scheduling an instruction for execution.

Turning now to FIG. 2, a flowchart is shown illustrating operation of one embodiment of the processor 10 in response to scheduling an instruction for execution. In superscalar embodiments, parallel operation of the flowchart of FIG. 2 for each instruction being concurrently executed may be provided. While the blocks are shown in a particular order for ease of understanding, other orders may be used. Blocks may be performed in parallel within the processor 10 (e.g. error checking and executing the instruction may be performed in parallel). Blocks, combinations of blocks, and/or the flowchart as a whole may be pipelined.

Each source operand may be read from either the working register file 18 (WRF) or the architected register file 20 (ARF). If the source operand is from the WRF (decision block 40, "yes" leg), the source operand may be read from the WRF and may be parity checked by the source parity check circuit 30 (block 42). If the source operand is from the ARF (decision block 40, "no" leg), the source operand may be read from the ARF and ECC checked by the source ECC check circuit 32 (block 44). If a source operand error is detected (either ECC or parity, depending on the operand source-decision 46, "yes" leg), the trap/commit control unit 22 may record the error for the instruction (block 48). In either case, the execute unit 24 may execute the instruction and write the result to the working register file 18 (block 50). In one embodiment, the working register file 18 may generate the parity in parallel with decoding the result register address. In other embodiments, the execute unit 24 may generate the parity and transmit the parity with the result. In one embodiment, the parity generation may not add any pipeline stages to the execution of instructions, where multi-bit ECC generation (e.g. Hamming code) might add a pipeline stage.

Figure 3:
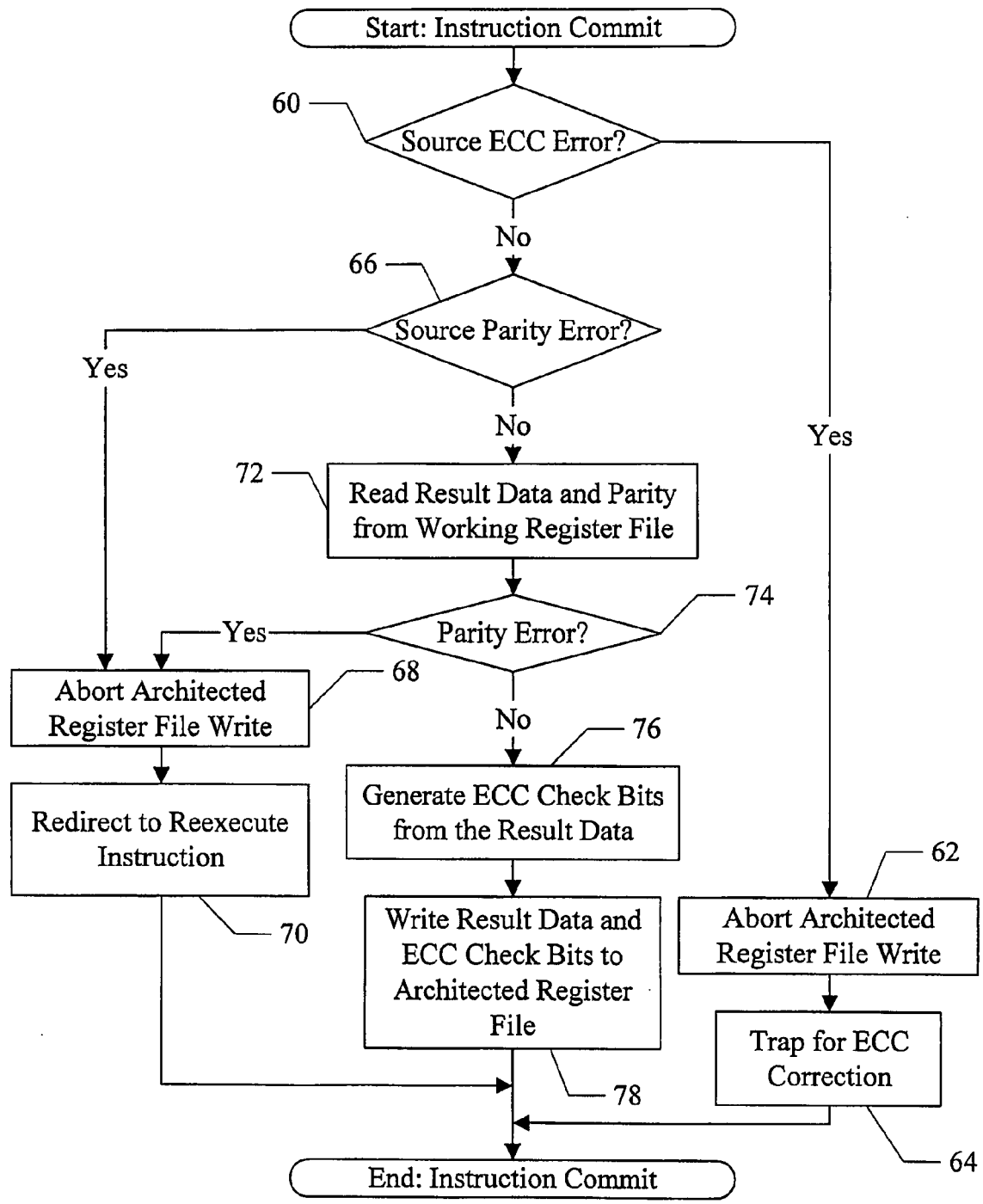
FIG. 3 is a flowchart illustrating operation of one embodiment of the processor in response to selecting an instruction for commit.

Turning now to FIG. 3, a flowchart is shown illustrating operation of one embodiment of the processor 10 in response selecting an instruction for commit. In embodiments in which more than one instruction can be committed per clock cycle, parallel operation of the flowchart of FIG. 3 for each instruction being concurrently committed may be provided (and reexecution or trap may be prioritized to the instruction that is oldest, in program order, of the instructions). While the blocks are shown in a particular order for ease of understanding, other orders may be used. Blocks may be performed in parallel within the processor 10 Blocks, combinations of blocks, and/or the flowchart as a whole may be pipelined.

If a source ECC error was detected for a source operand of the instruction (decision block 60, "yes" leg), the trap/commit control unit 22 may abort the architected register file write for the instruction (block 62) and may trap the instruction for ECC correction by the trap routine (block 64). If a source parity error was detected for a source operand of the instruction (decision block 66, "yes" leg), may also abort the architected register file write for the instruction (block 68) and may redirect the fetch unit to reexecute the instruction (block 70).

The result data and parity may be read from the working register file (responsive to the commit indication from the trap/commit control unit 22), and may be parity checked by the target parity check circuit 26 (block 72). If a parity error is detected (decision block 74, "yes" leg), the trap/commit control unit may abort the architected register file write for the instruction (block 68) and may redirect the fetch unit to reexecute the instruction (block 70). If no parity error is detected (decision block 74, "no" leg), the ECC generation unit 28 may generate ECC check bits from the result data (block 76) and may write the result data and ECC check bits to the architected register file 20 (block 78).

Figure 4:
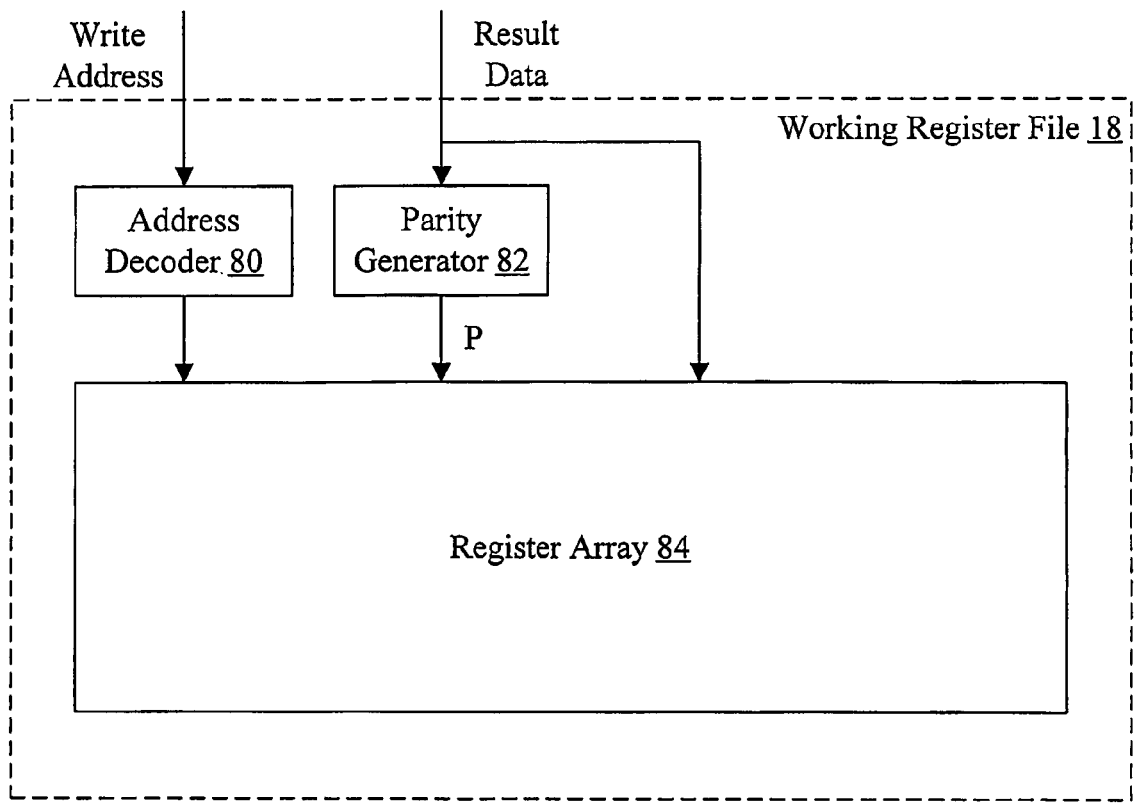
FIG. 4 is a block diagram illustrating one embodiment of a working register file.

Turning now to FIG. 4, a block diagram of one embodiment of the working register file 18 that incorporates parity generation is shown. In the illustrated embodiment, the working register file 18 includes address decoder 80, a parity generator 82, and a register array 84. The address decoder 80 is coupled to receive the write address from the execute unit 24 and decodes the address to select an entry in the register array 84 to store the data (e.g. wordline decode for an SRAM array). The parity generator 82 is coupled to receive the data and generate the parity (P) for storage. The register array is coupled to receive the wordlines, the parity, and the data and is configured to write the data and parity to the selected entry.

The parity generator 82 may be configured, in one embodiment, to generate the parity in the same amount of time that the address decoder 80 uses to decode the register address (or less). In some cases, more than one parity bit may be generated per data (over non-overlapping subsets of the data bits), so that the delay in the parity generator 82 may be matched to the address decoder 80.

Numerous variations and modifications will become apparent to those skilled in the art once the above disclosure is fully appreciated. It is intended that the following claims be interpreted to embrace all such variations and modifications.

What is claimed is:

1. A processor comprising:
a first register file configured to store speculative register state, the first register file protected by a first error protection scheme;
a second register file configured to store committed register state, the second register file protected by a second error protection scheme;
a check circuit coupled to receive a value and corresponding one or more check bits read from the first register file to be committed to the second register file in response to the processor selecting a first instruction to be committed, wherein the check circuit is configured to detect an error in the value responsive to the value and the check bits;
a control unit coupled to the check circuit and configured to cause reexecution of the first instruction responsive to the error detected by the check circuit; and
a second check circuit coupled to receive a source operand read from the first register file for a second instruction and corresponding one or more check bits, wherein the second check circuit is configured to detect a source error in the source operand, and wherein the control unit is coupled to the second check circuit and is configured to cause reexecution of a second instruction responsive to the source error.

2. The processor as recited in claim 1 wherein the control unit is configured to cause reexecution responsive to selecting the second instruction to be committed.

3. The processor as recited in claim 1 further comprising a third check circuit coupled to receive a second source operand read from the second register file for a third instruction and corresponding one or more check bits, wherein the third check circuit is configured to detect a second source error in the second source operand, and wherein the control unit is coupled to the third check circuit and is configured to trap the third instruction responsive to the second source error.

4. The processor as recited in claim 1 wherein the first error protection scheme comprises parity.

5. The processor as recited in claim 4 wherein a single parity bit is implemented per register value in the first register file.

6. The processor as recited in claim 4 wherein the second error protection scheme comprises a Hamming code.

7. The processor as recited in claim 1 further comprising a fetch unit configured to fetch instructions for execution, wherein the control unit is configured to cause reexecution of the first instruction by signalling the fetch unit to refetch the first instruction.

8. The processor as recited in claim 1 further comprising an error code generation circuit configured to generate check bits for storage in the second register file responsive to the value, and wherein the value and the check bits are written to the second register file if no error is detected.

9. The processor as recited in claim 1 wherein one or more check bits according to the first error protection scheme are generated during execution of the first instruction and are stored in the first register file with the value.

10. A processor comprising:
a first register file configured to store speculative register state, the first register file protected by parity;
a second register file configured to store committed register state, the second register file protected by a second error protection scheme that is more robust than parity;
a check circuit coupled to receive a value and corresponding parity read from the first register file to be committed to the second register file in response to the processor selecting a first instruction to be committed, wherein the check circuit is configured to detect an error in the value responsive to the value and corresponding parity;
an error code generation circuit coupled to receive the value read from the first register file to be committed to the second register file in response to the processor selecting the first instruction to be committed, wherein the error code generation circuit is configured to generate a second one or more check bits for storage in the second register file responsive to the value, and wherein the value and the second one or more check bits are written to the second register file responsive to a lack of error being detected by the check circuit; and
a control unit coupled to the check circuit and configured to cause reexecution of the first instruction responsive to the error detected by the check circuit.

11. The processor as recited in claim 10 further comprising a fetch unit configured to fetch instructions for execution, wherein the control unit is configured to cause reexecution of the first instruction by signalling the fetch unit to refetch the first instruction.

12. A processor comprising:
a first register file configured to store speculative register state, the first register file protected by a first error protection scheme;
a second register file configured to store committed register state, the second register file protected by a second error protection scheme;
a check circuit coupled to receive a value and corresponding one or more check bits read from the first register file to be committed to the second register file in response to the processor selecting a first instruction to be committed, wherein the check circuit is configured to detect an error in the value responsive to the value and the check bits;
an error code generation circuit coupled to receive the value read from the first register file to be committed to the second register file in response to the processor selecting the first instruction to be committed, wherein the error code generation circuit is configured to generate a second one or more check bits for storage in the second register file responsive to the value, and wherein the value and the second one or more check bits are written to the second register file responsive to a lack of error being detected by the check circuit; and
a control unit coupled to the check circuit and configured to cause reexecution of the first instruction responsive to the error detected by the check circuit.

13. The processor as recited in claim 12 further comprising a second check circuit coupled to receive a source operand read from the first register file for a second instruction and corresponding one or more check bits, wherein the second check circuit is configured to detect a source error in the source operand, and wherein the control unit is coupled to the second check circuit and is configured to cause reexecution of a second instruction responsive to the source error.

14. The processor as recited in claim 13 wherein the control unit is configured to cause reexecution responsive to selecting the second instruction to be committed.

15. The processor as recited in claim 13 further comprising a third check circuit coupled to receive a second source operand read from the second register file for a third instruction and corresponding one or more check bits, wherein the third check circuit is configured to detect a second source error in the second source operand, and wherein the control unit is coupled to the third check circuit and is configured to trap the third instruction responsive to the second source error.

16. The processor as recited in claim 12 wherein the first error protection scheme comprises parity.

17. The processor as recited in claim 16 wherein a single parity bit is implemented per register value in the first register file.

18. The processor as recited in claim 16 wherein the second error protection scheme comprises a Hamming code.

19. The processor as recited in claim 12 further comprising a fetch unit configured to fetch instructions for execution, wherein the control unit is configured to cause reexecution of the first instruction by signalling the fetch unit to refetch the first instruction.

* * * * *